(12) United States Patent
Wright et al.

(10) Patent No.: US 12,724,718 B2
(45) Date of Patent: Sep. 1, 2026

(54) CRYPTOGRAPHIC COMPUTATIONS FOR MEMORY REGIONS

(71) Applicant: HEWLETT PACKARD ENTERPRISE DEVELOPMENT LP, Spring, TX (US)

(72) Inventors: Joseph Wright, Tomball, TX (US); Chris Davenport, Houston, TX (US); Kevin E. Boyum, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 124 days.

(21) Appl. No.: 18/534,460

(22) Filed: Dec. 8, 2023

(65) Prior Publication Data

US 2025/0190369 A1 Jun. 12, 2025

(51) Int. Cl.
*G06F 12/14* (2006.01)
*G06F 21/54* (2013.01)

(52) U.S. Cl.
CPC ...... *G06F 12/1408* (2013.01); *G06F 12/1441* (2013.01); *G06F 21/54* (2013.01)

(58) Field of Classification Search
CPC .. G06F 12/1408; G06F 12/1441; G06F 21/54; G06F 21/79; G06F 21/602
See application file for complete search history.

(56) References Cited

U.S. PATENT DOCUMENTS

| | | | | |
|---|---|---|---|---|
| 9,225,729 | B1 * | 12/2015 | Moen | H04L 63/0876 |
| 12,141,595 | B1 * | 11/2024 | Radcliffe | G06F 8/60 |
| 2015/0033034 | A1 * | 1/2015 | Gerzon | G06F 21/71 713/190 |
| 2018/0121644 | A1 * | 5/2018 | Baker | G06F 21/51 |
| 2023/0036165 | A1 * | 2/2023 | Bursell | G06F 21/78 |
| 2024/0372731 | A1 * | 11/2024 | Kobel | H04L 9/3239 |

FOREIGN PATENT DOCUMENTS

WO WO-2017116803 A1 * 7/2017 .......... H04L 67/125

* cited by examiner

*Primary Examiner* — Fatoumata Traore
*Assistant Examiner* — Carlton Johnson
(74) *Attorney, Agent, or Firm* — Trop, Pruner & Hu, P.C.

(57) ABSTRACT

In some examples, a controller receives, from a validator system in an electronic device, input information including address information identifying a memory region in a memory to validate. The memory is associated with a target system to be validated and the memory is inaccessible to the validator system. Based on the address information, the controller retrieves information from the memory region in the memory, where the controller provides a barrier that prevents access of the retrieved information by the validator system. The controller computes a cryptographic value based on the retrieved information, and the controller sends, to the validator system, an output based on the cryptographic value as a response to the input information.

20 Claims, 4 Drawing Sheets

CRYPTOGRAPHIC COMPUTATIONS FOR MEMORY REGIONS

BACKGROUND

An electronic device can execute machine-readable instructions, including software and firmware. Software can include an operating system (OS) and application programs, for example. Firmware can include Basic Input/Output System (BIOS) code, Universal Extensible Firmware Interface (UEFI) code, or other firmware executed on a central processing unit (CPU) of an electronic device. Other software or firmware may execute on other processing devices of an electronic device, such as a microcontroller, a programmable integrated circuit, a programmable gate array, or another hardware processing circuit.

BRIEF DESCRIPTION OF THE DRAWINGS

Some implementations of the present disclosure are described with respect to the following figures.

Figure 1:
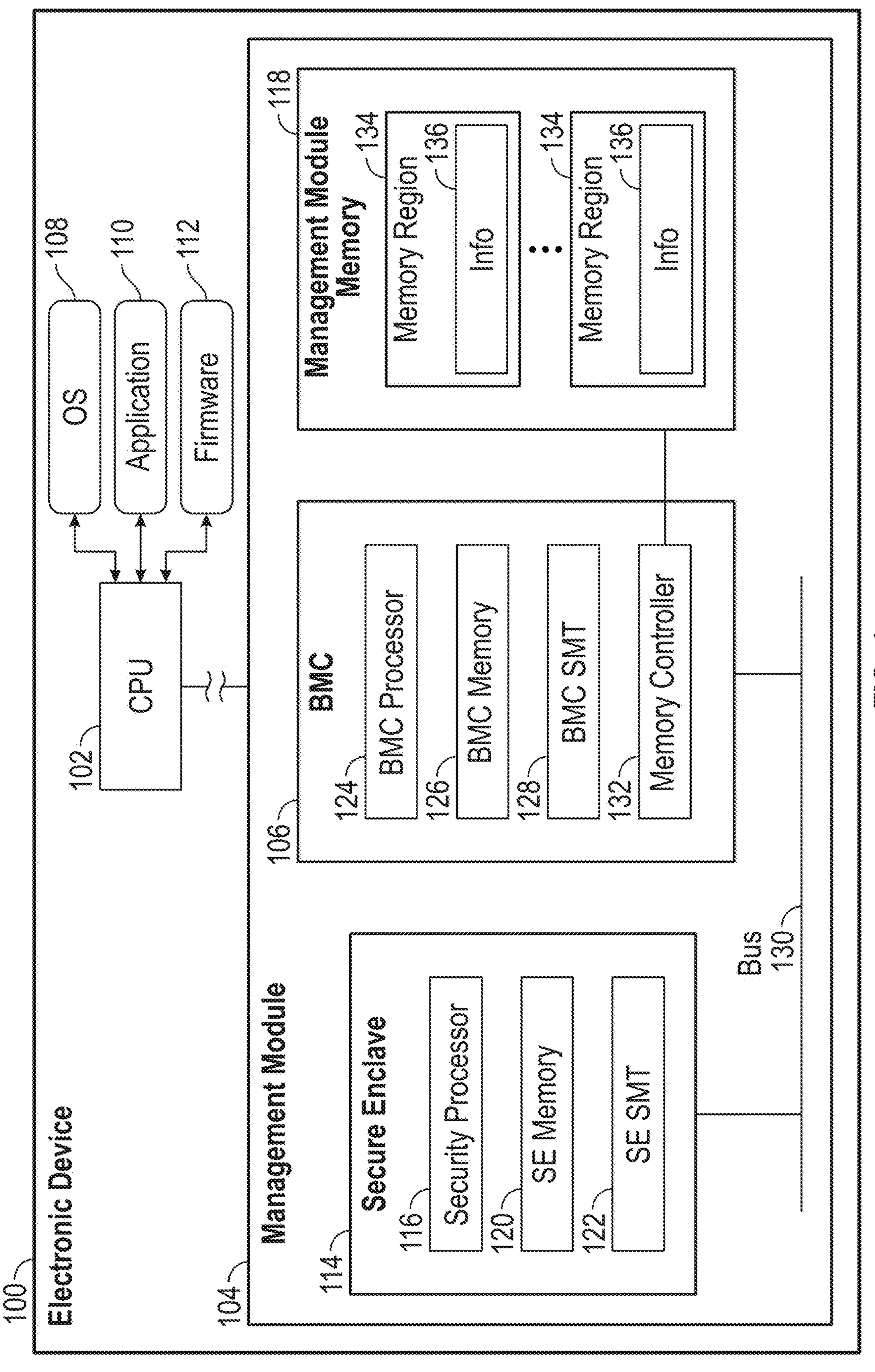
FIG. 1 is a block diagram of an electronic device that includes embedded systems such as a baseboard management controller (BMC) and a secure enclave, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An electronic device may include an embedded system (or multiple embedded systems). An "embedded system" refers to a processing assembly within an electronic device, where the processing assembly has specific functionalities. Some of the functionalities of the embedded system may be performed by machine-readable instructions (e.g., firmware or software) executed by the embedded system.

Embedded systems in electronic device may be compromised by attackers, such as malware, human hackers, or other entities. For example, machine-readable instructions executed by an embedded system may be modified or replaced by an attacker, which leads to the execution of compromised machine-readable instructions by the embedded system. The compromised machine-readable instructions may perform unauthorized activities in an electronic device, such as accessing sensitive information, causing the electronic device to perform malicious actions, corrupting data or causing errors in the electronic device, or other activities.

A trust mechanism may be implemented in an electronic device to establish trust of an embedded system. An example of such a trust mechanism is a Silicon Root of Trust (SROT) mechanism, which is an example of a hardware-based trust mechanism that is used to validate information (e.g., machine-readable instructions, configuration information, security information, or other information) of the embedded system prior to execution of the embedded system. For example, when the electronic device initially starts (such as due to powering on from a lower power or off state, a reboot, a reset, etc.), the SROT mechanism performs a measurement of the information of the embedded system, and uses a value (e.g., a hash value) produced by the measurement to perform a validation of the information of the embedded system.

Although the SROT mechanism may establish trust of the embedded system in the initial start process of the electronic device, the SROT mechanism may not provide protection during runtime of the electronic device. The "runtime" of the electronic device refers to a state of the electronic device after "primary" machine-readable instructions of the electronic device have been started. The primary machine-readable instructions can include an operating system (OS), system firmware, and/or any other machine-readable instructions executed on a CPU of the electronic device to perform tasks of the electronic device. During runtime, information of the embedded system may become compromised. If not detected, the information that is compromised during runtime can lead to unauthorized access of sensitive information or other unauthorized activities in the electronic device.

In accordance with some implementations of the present disclosure, a secure memory transducer supports secure measurements, by a validator system during runtime or during an initial start process of an electronic device, of information in a memory associated with a target system that is separate from the validator system. At the request of the validator system, the secure memory transducer generates a cryptographic value based on information from a selected memory region of the memory. The request from the validator system includes address information that specifies a memory range defining a memory region (of a minimum size) of the memory. The secure memory transducer provides an isolation barrier that prevents the validator system from directly obtaining any information from the memory but does allow the validator system to obtain cryptographic values based on information in the memory. Requests for cryptographic values can be submitted on-demand by the validator at any time, including during a startup of the target system or during runtime of the target system. The isolation barrier provided by the secure memory transducer reduces the likelihood that the information in the memory is exposed to an unauthorized entity. Instead of providing the information of the memory over a link (which may be the subject of an attack) to the validator system, the secure memory transducer provides just the cryptographic values derived from the information in the memory over the link to the validator system.

FIG. 1 is a block diagram of an electronic device 100 that includes a CPU 102 and a management module 104. Examples of the electronic device 100 can include any or some combination of the following: a computer (e.g., a desktop computer, a notebook computer, a tablet computer, a server computer, or another type of computer), a smartphone, a communication node (e.g., a switch, a router, a gateway, or another type of device that supports communications), a storage system, a game appliance, an Internet of Things (IoT) device, a household appliance, a vehicle, or any other type of electronic device.

The CPU 102 can include one or more processors, which form a processing resource of the electronic device 100. The CPU 102 executes primary machine-readable instructions such as an OS 108, an application program 110, system firmware (e.g., BIOS code or UEFI code) 112, or other software or firmware. A processor can include a microprocessor, a core of a multi-core microprocessor, a microcontroller, a programmable integrated circuit, a programmable gate array, or another hardware processing circuit.

In further examples, the electronic device 100 may not execute an OS or an application program, in which case the OS 108 and the application program 110 are omitted.

The management module 104 includes a baseboard management controller (BMC) 106, a secure enclave 114, and a management module memory 118 (which may be external to the BMC 106 and the secure enclave 114). The CPU 102 may be coupled to the BMC 106, such as through an input/output (I/O) bridge (not shown), which is a device that interconnects various different components.

A "memory" can be implemented using one or more memory devices, such as a dynamic random access memory (DRAM) device, a static random access memory (SRAM) device, a flash memory device, or any other type of memory device. More generally, a memory includes storage elements that store information.

The management module 104 can be implemented with an integrated circuit chip, with a circuit board, or with an arrangement of discrete electronic components. The BMC 106 performs various management tasks, which are discussed further below. Although reference is made to a BMC in some examples, other types of management controllers can be used in other examples. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The secure enclave 114 (also referred to as a secure boundary or a secure perimeter) includes a subsystem of the management module 104 for which access into and out of the subsystem is more tightly controlled than access of other subsystems of the management module 104. For example, the secure enclave 114 is fully disposed inside a cryptographic boundary. A "cryptographic boundary" can refer to a continuous boundary, or perimeter, which contains the logical and physical components of a cryptographic subsystem, such as components of the secure enclave 114. The secure enclave 114, in accordance with some examples, is isolated from components outside the secure enclave 114. The cryptographic boundary is defined using a secure access mechanism such as by using encryption or another type of access control to protect components in the secure enclave 114 from unauthorized access by components outside the secure enclave 114.

The secure enclave 114 includes a security processor 116 that can perform various security-related functions of the management module 104, including generating and/or maintaining keys related to cryptographic operations, such as encryption keys to encrypt information or private keys for signing information. The security processor 116 can also maintain security certificates used to authenticate an identity of an entity such as a user, a program, a website, an organization, a device, a program, or any other type of entity. Further examples of security-related functionalities that can be performed by the security processor 116 include root of trust operations (including measuring information such as machine-readable instructions or other information, performing signature verification, performing decryption, performing attestation, etc.), random number and entropy generation, or other security-related functionalities.

The secure enclave 114 further includes a secure enclave (SE) memory 120, which can store information of the secure enclave 114, such as encryption keys and other information. In some examples, the secure enclave 114 may include an SE secure memory transducer (SMT) 122. The SE secure memory transducer 122 may operate independently of the security processor 116, so that computations performed by the SE secure memory transducer 122 does not burden the security processor 116. In further examples, the SE secure memory transducer 122 may be omitted from the secure enclave 114. A description of a secure memory transducer is provided further below.

The BMC 106 includes a BMC processor 124 that executes machine-readable instructions of the BMC 106 to perform management tasks of the BMC 106. The BMC 106 further includes a BMC memory 126. In some examples, the BMC 106 may include a BMC secure memory transducer (SMT) 128. The BMC secure memory transducer 128 may operate independently of the BMC processor 124, so that computations performed by the BMC secure memory transducer 128 does not burden the BMC processor 124. In further examples, the BMC secure memory transducer 128 may be omitted from the BMC 106.

In some examples, the BMC 106 includes a memory controller 132 that manages the access to the management module memory 118. For example, the memory controller 132 can issue read and write commands to the management module memory 118 in response to requests made in the BMC 106 or requests of an external requester, such as the CPU 102 or the secure enclave 114.

The BMC 106 is coupled over a bus 130 to the secure enclave 114. The bus 130 can refer to any type of communication link over which electronic components are able to communicate, such as a memory bus, a storage bus, a network, or any other type of link (whether wired or wireless). The BMC 106 and the secure enclave 114 are examples of embedded systems in the electronic device 100. The BMC 106 and the secure enclave 114 perform respective specific functionalities. In further examples, the electronic device 100 may include additional or alternative embedded systems.

Each of the embedded systems of the electronic device 100 may be compromised by attackers. To protect against attacks of an embedded system, the electronic device 100 includes a trust mechanism that allows a validator system to establish trust of a target system (e.g., an embedded system). For example, the secure enclave 114 may be the validator system, and the BMC 106 may be the target system. Alternatively, the BMC 106 may be the validator system, and the secure enclave 114 may be the target system.

The trust mechanism can include a root of trust mechanism that measures information of the target system. In some examples, when the electronic device 100 first starts up (e.g., the electronic device 100 is powered on from a lower power state or an off set, the electronic device 100 is exiting from a reset or reboot, or for any other reason), the root of trust mechanism (which may include root of trust hardware) in the secure enclave 114 can validate information of the secure enclave 114, such as machine-readable instructions and other information stored in the SE memory 120 of the secure enclave 114. The root of trust hardware of the secure enclave 114 can be implemented with a portion of the security processor 116 of the secure enclave 114, or with separate processing circuitry. If the root of trust hardware is able to successfully validate the information of the secure enclave 114, the secure enclave 114 (more specifically, the security processor 116) can validate information of the BMC 106. The information of the BMC 106 can be stored in the BMC memory 126 (that is inside the BMC 106) and/or in the management module memory 118 (that is outside the BMC 106). In this example, the secure enclave 114 is the validator system that validates information of the BMC 106 as the target system during the startup of the electronic device 100.

In the example of FIG. 1, the management module memory 118 includes memory regions 134 that contain information 136 to be validated by a validator system. A "memory region" of a memory can refer to a portion of the memory, where the portion can be made up of a contiguous section of the memory or made up of non-contiguous sections of the memory. The memory region can be identified using memory addresses that define a range of address locations in the memory.

The information 136 to be validated can include any or some combination of the following: machine-readable instructions (such as firmware or software to be executed by the BMC 106), configuration information (e.g., of the BMC 106), security information (e.g., used by the BMC 106 to perform secure operations such as encrypting information, signing information, and so forth), or other information that if compromised may cause a target system such as the BMC 106 to perform unauthorized activities or to behave in an unexpected manner.

In accordance with some examples of the present disclosure, the secure enclave 114 can also validate information of the BMC 106 during runtime of the electronic device 100, such as after any of the following machine-readable instructions are executed: the OS 108, the application program 110, and/or the system firmware 112. In examples where the electronic device 100 does not execute an OS or an application program, then the runtime of the electronic device 100 occurs when system firmware 112 is executed by the CPU 102.

In further examples, the BMC 106 may be the validator system that validates information of the secure enclave 114, such as information in the SE memory 120 of the secure enclave 114. The BMC 106 validating the information of the secure enclave 114 can be performed during startup of the electronic device 100 and/or during runtime of the electronic device 100.

A validator system uses a secure memory transducer to perform the validation of information of a target system. For example, if the secure enclave 114 is the validator system and the BMC 106 is the target system, then the secure enclave 114 can use the SE secure memory transducer 122 or the BMC secure memory transducer 128 to perform the validation. In some examples, the secure enclave 114 can use the SE secure memory transducer 122 to obtain a cryptographic value based on information of the target system (the BMC 106). Alternatively, the secure enclave 114 can use the BMC secure memory transducer 128 to obtain a cryptographic value of the information of the target system (the BMC 106). In examples where the secure enclave 114 uses its own SE secure memory transducer 122 to obtain a cryptographic value based on information of a target system, the SE secure memory transducer 122 would have access to the bus 130, but the remaining elements (including the security processor 116) of the secure enclave 114 would not have access to the bus 130 (e.g., the remaining elements are not connected to the bus 130), which would prevent the remaining elements of the secure enclave 114 from being able to access the information retrieved by the SE secure memory transducer 122 from the memory associated with the target system.

In the reverse direction, if the BMC 106 is the validator system and the secure enclave 114 is the target system, then the BMC 106 can use either the BMC secure memory transducer 128 or the SE secure memory transducer 122 in the secure enclave 114 to obtain a cryptographic value of information of the secure enclave 114. In examples where the BMC 106 uses its own BMC secure memory transducer 128 to obtain a cryptographic value based on information of a target system, the BMC secure memory transducer 128 would have access to the bus 130, but the remaining elements (including the BMC processor 124) of the BMC 106 would not have access to the bus 130, which would prevent the remaining elements of the BMC 106 from being able to access the information retrieved by the BMC secure memory transducer 128 from the memory associated with the target system.

The validator system uses a cryptographic value derived from information in a memory region of a memory associated with the target system to perform a validation. For example, the derived cryptographic value can be compared to a stored cryptographic value (stored by the validator system) to determine whether the cryptographic values match. If the cryptographic values match, then that is an indication that the information of the target system has not been compromised. However, if the cryptographic values do not match, then that is an indication that the information of the target system may have been compromised.

The validator system issues a request to the target system over the bus 130. The request can be in the form of a message, a command, a signal, or an information element sent over the bus 130. The request can include address information that includes a starting address and an ending address defining a range of memory addresses that identify one or more memory regions, such as the memory regions 134 in the management module memory 118. The memory addresses in other examples can identify memory regions in the BMC memory 126 or in the SE memory 120, or in any other memory of the electronic device 100.

Figure 2:
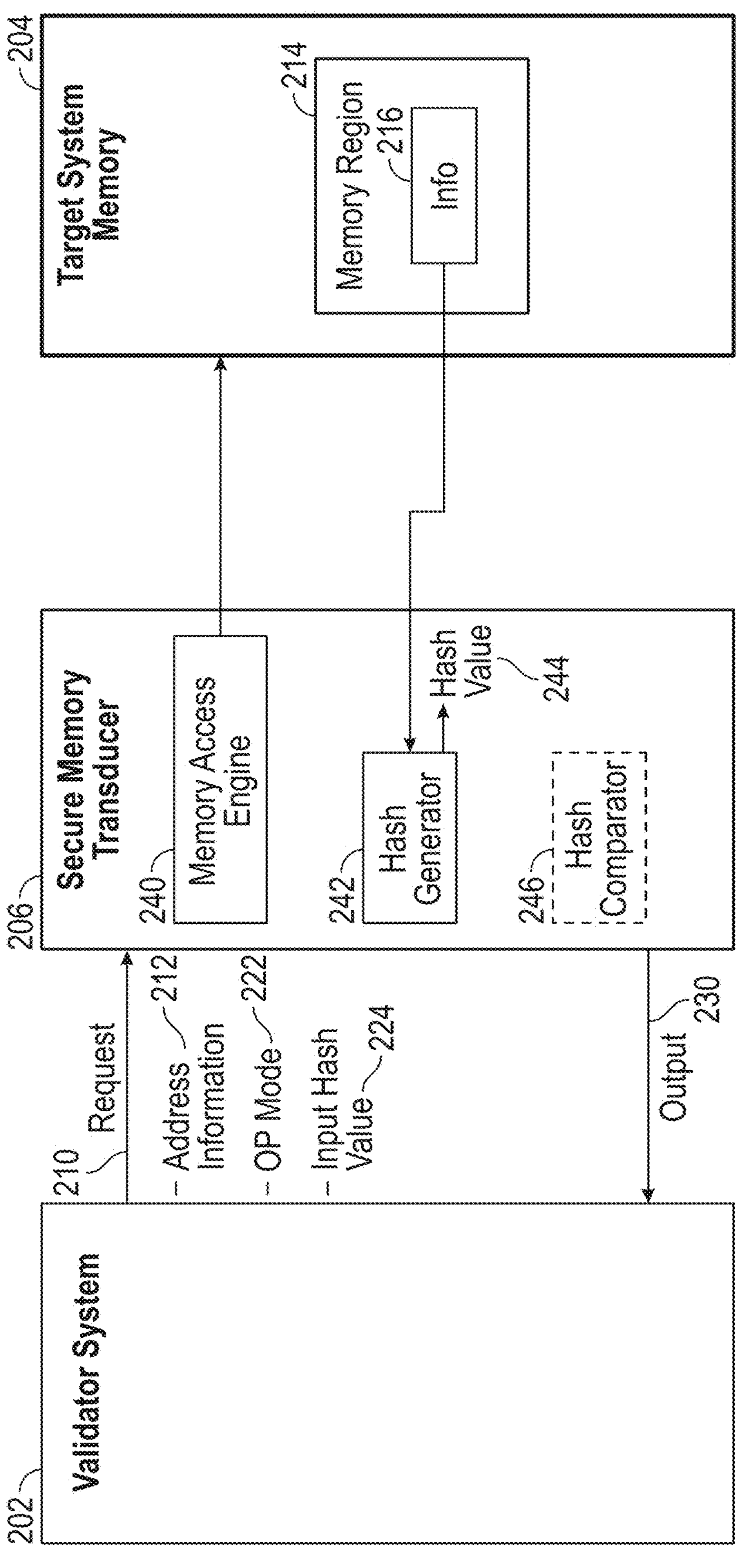
FIG. 2 is a block diagram of an arrangement including a validator system, a secure memory transducer, and a target system memory, according to some examples.

FIG. 2 is a block diagram of an example that includes a validator system 202 and a target system memory 204 that is associated with a target system. The target system memory 204 may be included in the target system or may be outside the target system. The validator system 202 uses a secure memory transducer 206 to obtain a cryptographic value based on information 216 stored in a memory region 214 of the target system memory 204. In some examples, the validator system 202 may be the secure enclave 114, the target system memory 204 may be the BMC memory 126 or the management module memory 118, and the secure memory transducer 206 may be the SE secure memory transducer 122 or the BMC secure memory transducer 128 of FIG. 1. Note that the secure memory transducer 206 may be part of the validator system 202, part of the target system, or separate from both the validator system 202 and the target system. In examples where the validator system 202 uses its own secure memory transducer to obtain a cryptographic value based on information of the target system memory 204, the secure memory transducer would have access to a bus (e.g., the bus 130 of FIG. 1) that interconnects the validator system and the target system, but the remaining elements of the validator system 202 would not have access to the bus, which would prevent the remaining elements of the validator system 202 from being able to access the information retrieved by the secure memory transducer from the target system memory 204.

The validator system 202 sends a validation request 210 to the secure memory transducer 206. The validation request 210 includes address information 212 that specifies an address range of the memory region 214 in the target system memory 204 that is to be accessed. For example, the address information 212 can include a start address and an end address of the memory region 214.

In response to the validation request 210, a memory access engine 240 in the secure memory transducer 206 performs an access of the memory region specified by the address information 212. Note that the memory access engine 240 may access the target system memory 204 directly, or may use a memory controller (e.g., the memory controller 132 of FIG. 1) to access the target system memory 204. In either case, the secure memory transducer 206 is able to access the memory region 214 without restrictions, whereas the validator system 202 is not able to access the memory region 214. The secure memory transducer 206 thus provides an isolation barrier to protect the information 216 from unauthorized access.

The secure memory transducer 206 further includes a hash generator 242 that receives the information 216 read from the memory region 214. The information 216 is provided as an input to the hash generator 242, which produces a cryptographic hash value 244. The cryptographic hash value can be produced by applying a cryptographic hash function, such as a Secure Hash Algorithm 2 (SHA-2) function or any other type of cryptographic hash function. More generally, a cryptographic value can be produced by the secure memory transducer 206 based on application of a security function on the information 216 retrieved from the memory region 214. A cryptographic value such as a cryptographic hash value produced by an SHA-2 function or any other one-way function may not be reverse engineered to produce the original information from which the cryptographic value was computed.

In some examples, to prevent reverse engineering of cryptographic hash values to obtain original information from which the cryptographic hash values were computed, the secure memory transducer 206 can first check that the address information 212 specifies a memory region with a size that exceeds a threshold size (e.g., a minimum size). For example, the threshold size may be 32 bytes or any other threshold size. If the address information 212 specifies a memory region with a size that is less than the threshold size, the secure memory transducer 206 can reject the validation request 210, such as by returning an error indication. If the address information 212 specifies a memory region with a size that exceeds the threshold size, the secure memory transducer 206 can proceed with performing operations to satisfy the validation request 210.

The secure memory transducer 206 sends an output 230 to the validator system 202, where the output 230 constitutes a response to the validation request 210. The output 230 is based on the cryptographic hash value 244. The output 220 may either be the cryptographic hash value 244, or alternatively, may be an indicator that is based on the cryptographic hash value 244.

The form of the output 220 can depend upon an operation mode of the secure memory transducer 206. In some examples, the secure memory transducer 206 can operate in any of multiple operation modes, including a direct mode or an indirect mode. In the direct mode, the secure memory transducer 206 reports the cryptographic hash value 244 as part of the output 230 to the validator system 202.

In the indirect mode, instead of providing the cryptographic hash value 244 to the validator system 202, the secure memory transducer 206 can instead provide an indicator of whether the cryptographic hash value 244 satisfies a criterion. For example, the indicator can be indication of whether the cryptographic hash value 244 matches an input cryptographic hash value.

In some examples, the validation request 210 can include an operation (OP) mode field 222 that can be set to any of multiple values that correspond to the different operation modes of the secure memory transducer 206. If the OP mode field 222 is set to a first value, then the secure memory transducer 206 operates in the direct mode. If the OP mode field 222 is set to a second value that is different from the first value, then the secure memory transducer 206 operates in the indirect mode. The OP mode field 222 may be settable to other values if there are other operation modes supported by the secure memory transducer 206.

If the OP mode field 222 is set to the second value indicating that the indirect mode is to be used, the validation request 210 may further include an input cryptographic hash value 224 that is to be compared to the computed cryptographic hash value 244 as computed by the hash generator 242 from the information 216 retrieved from the memory region 214. A hash comparator 246 in the secure memory transducer 206 compares the computed cryptographic hash value 244 to the input cryptographic hash value 224. If the hash comparator 246 determines that the computed cryptographic hash value 244 does not match the input cryptographic hash value 224, then the hash comparator 246 can set an indicator in the output 220. The indicator can be in the form of an interrupt signal that is activated by the secure memory transducer 206 in case the computed cryptographic hash value 244 does not match the input cryptographic hash value 224. The interrupt signal provides an indication to the validator system 202 of a potential compromise of the information 216 in the memory region 214 specified by the address information 212.

In other examples, the secure memory transducer 206 can store the indicator (of a mismatch of the computed cryptographic hash value 244 and the input cryptographic hash value 224) in a register or other storage element of the secure memory transducer 206. The validator system 202 can poll the register or other storage element to read the indicator. In these examples, the indicator can be a flag (e.g., a bit or a collection of bits) in the register or another storage element. The flag set to a first value indicates a mismatch of the computed cryptographic hash value 244 and the input cryptographic hash value 224. The flag set to a different second value indicates a match of the computed cryptographic hash value 244 and the input cryptographic hash value 224. The flag is included in the output 220 when polled by the validator system 202.

The memory access engine 240, the hash generator 242, and the hash comparator 246 may be implemented with hardware processing circuitry of the secure memory transducer 206. Alternatively, the memory access engine 240, the hash generator 242, and the hash comparator 246 may be implemented with machine-readable instructions executed by the secure memory transducer 206.

Use of a secure memory transducer according to some implementations of the present disclosure allow for trust to be provided of information associated with a target system while protecting the information from unauthorized access. Also, use of the secure memory transducer provides a lightweight trust mechanism that reduces impact on operations of embedded systems, including a validator system and a target system.

Figure 3:
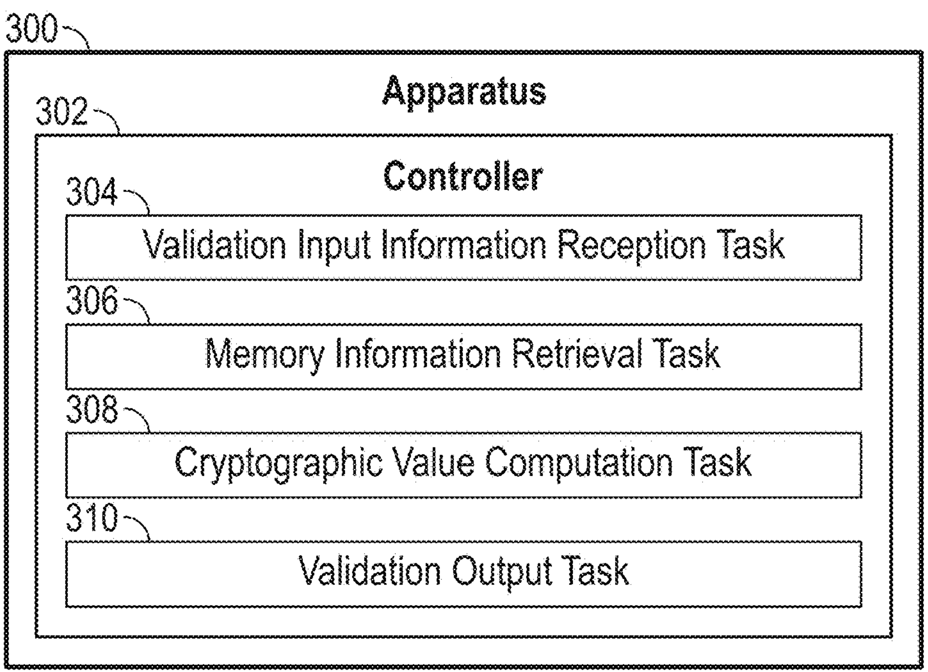
FIG. 3 is a block diagram of an apparatus including a controller according to some examples.

FIG. 3 is a block diagram of an apparatus 300 that includes a controller 302 to perform various tasks. The apparatus 300 may be a secure memory transducer as discussed above. The controller 302 may be implemented as a processor, a microcontroller, a programmable integrated circuit, a programmable gate array, discrete chips, or another hardware processing circuit. The controller 302 may be implemented with just hardware, or with a combination of machine-readable instructions and hardware processing circuitry that executes the machine-readable instructions.

The tasks of the controller 302 include a validation input information reception task 304 to receive, from a validator system in an electronic device, input information including address information identifying a memory region in a memory to validate. For example, the memory may be the management module memory 118, the BMC memory 126, or the SE memory 120 of FIG. 1. The memory is associated with a target system to be validated and the memory is inaccessible to the validator system. The target system is part of the electronic device and is separate from the validator system.

The tasks of the controller 302 include a memory information retrieval task 306 to, based on the address information, retrieve information from the memory region in the memory. The controller 302 provides a barrier that prevents access of the retrieved information by the validator system.

The tasks of the controller 302 include a cryptographic value computation task 308 to compute a cryptographic value based on the retrieved information. The cryptographic value can be computed by applying a cryptographic hash function on the retrieved information, for example.

The tasks of the controller 302 include a validation output task 310 to send, from the controller 302 to the validator system, an output based on the cryptographic value as a response to the input information. In some examples, the output based on the cryptographic value includes the cryptographic value. In further examples, the output based on the cryptographic value includes an interrupt signal to the validator system, or an indicator read from a storage element of the validator system. The interrupt signal or the indicator can indicate that the cryptographic value does not satisfy a criterion (e.g., does not match an input cryptographic value).

In some examples, the address information identifies an address range that defines the memory region. In some examples, the controller 302 can confirm that the address range defines the memory region of a predefined minimum size. The retrieval of the information from the memory region, the computation of the cryptographic value, and the sending of the cryptographic value are performed responsive to a confirmation by the controller 302 that the address range defines the memory region of the predefined minimum size.

In some examples, the controller 302 has direct memory access of the memory, but the validator system does not have direct memory access of the memory.

In some examples, the target system includes a processor to execute machine-readable instructions, and the controller 302 operates independently of the processor of the target system. In some examples, the validator system includes a processor to execute machine-readable instructions, and the controller 302 operates independently of the processor of the validator system.

Figure 4:
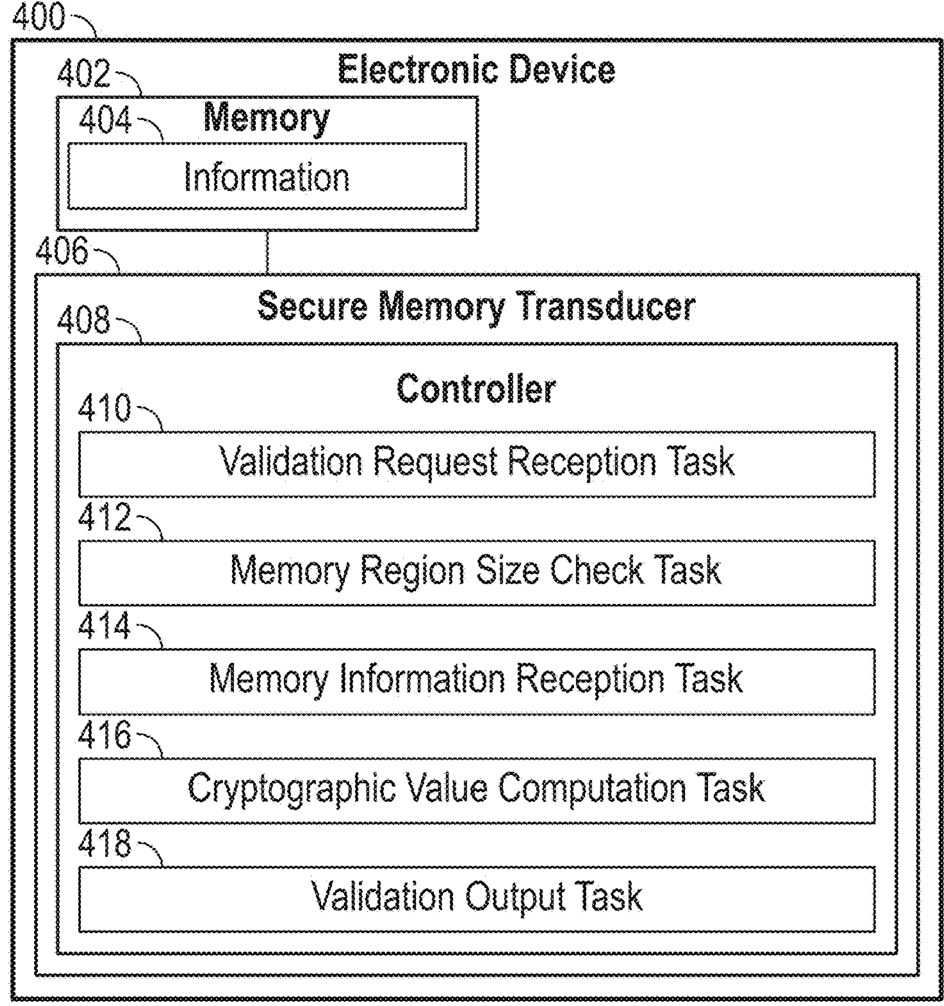
FIG. 4 is a block diagram of an electronic device according to some examples.

FIG. 4 is a block diagram of an electronic device 400 that includes a memory 402 to store information 404 associated with a target system. The electronic device 400 further includes a secure memory transducer 406 including a controller 408. The controller 408 is to perform various tasks.

The tasks of the controller 408 include a validation request reception task 410 to receive, from a validator system, a validation request including address information identifying a memory region in the memory 402 to validate. The information 404 in the memory 402 is inaccessible to the validator system, and the target system is separate from the validator system.

The tasks of the controller 408 include a memory region size check task 412 to check that the address information identifies the memory region with a size exceeding a threshold size. The threshold size may be a minimum size to prevent reverse engineering of a cryptographic value derived from the information 404.

The tasks of the controller 408 include a memory information retrieval task 414 to, based on a determination that the address information identifies the memory region with a size exceeding the threshold size, retrieve the information 404 from the memory region in the memory 402.

The tasks of the controller 408 include a cryptographic value computation task 416 to compute a cryptographic value based on the retrieved information 404. The cryptographic value may be a cryptographic hash value.

The tasks of the controller 408 include a validation output task 418 to send, from the controller 408 to the validator system, an output based on the cryptographic value as a response to the validation request. In some examples, the output based on the cryptographic value includes the cryptographic value. In further examples, the output based on the cryptographic value includes an interrupt signal to the validator system, or an indicator read from a storage element of the validator system.

Figure 5:
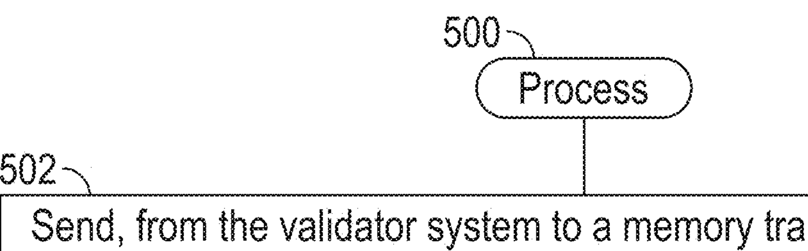
FIG. 5 is a flow diagram of a process according to some examples.

FIG. 5 is a flow diagram of a process 500, which may be performed by a validator system with a hardware processor (such as any of 114, 106, or 202 in FIG. 1 or 2). A hardware processor can include a microprocessor, a core of a multi-core microprocessor, a microcontroller, a programmable integrated circuit, a programmable gate array, or another hardware processing circuit.

The process 500 includes sending (at 502), from the validator system to a memory transducer, a validation request to validate a target system that is associated with information stored in a memory. The validation request includes address information identifying a memory region in the memory. The memory transducer provides an isolation barrier preventing the validator system from accessing the information in the memory, and the target system is part of an electronic device and the validation request is sent during a runtime of the electronic device.

The process 500 includes receiving (at 504), by the validator system from the memory transducer, a response based on a cryptographic value computed by the memory transducer based on the information retrieved from the memory region in the memory. In some examples, the memory transducer includes a hash generator (e.g., 242 in FIG. 2) that generates a cryptographic hash value based on the retrieved information.

The process 500 includes determining (at 506), by the validator system based on the response, whether the target system is compromised during the runtime of the electronic device. For example, the validator system may compare a received cryptographic value to a stored cryptographic value to determine whether the cryptographic values match. As another example, the validator system may check for an indicator in the response of whether the memory transducer has indicated that the cryptographic value computed by the memory transducer violates a criterion and thus indicates that the target system is compromised.

A "BMC" (e.g., the BMC 106 of FIG. 1) can refer to a specialized service controller that monitors the physical state of an electronic device using sensors and communicates with a remote management system (that is remote from the electronic device) through an independent "out-of-band" connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the computer system to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply (e.g., a battery); as a result, the electronic device does not have to be powered on to allow the BMC to perform the BMC's operations. The auxiliary power supply is separate from a main power supply that supplies powers to other components (e.g., a main processor, a memory, an input/output (I/O) device, etc.) of the electronic device.

In examples where tasks of a secure memory transducer are performed by memory-readable instructions, the memory-readable instructions can be stored in a storage medium, which can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:

a controller to:

receive, from a validator system in an electronic device, a validation request comprising address information identifying a memory region in a memory to validate, wherein the memory is associated with a target system to be validated and the memory is inaccessible to the validator system, and wherein the target system is part of the electronic device and is separate from the validator system;

determine whether the address information in the validation request identifies the memory region with a size exceeding a threshold size, wherein the size being less than the threshold size indicates an error condition;

based on a determination that the size of the memory region identified by the address information in the validation request exceeds the threshold size, retrieve information from the memory region in the memory identified by the address information, the controller providing a barrier that prevents access of the retrieved information by the validator system;

compute a cryptographic value based on the retrieved information;

based on a comparator determining the computed cryptographic value does not match an input cryptographic value in the validation request, set a compromise indicator by the controller; and send, from the controller to the validator system, an output as a response to the validation request, the output comprising the compromise indicator indicating a potential compromise of the information in the memory region identified by the address information.

2. The apparatus of claim 1, wherein the address information identifies an address range that defines the memory region.

3. The apparatus of claim 2, wherein the controller is to reject the validation request in response to determining that the size of the memory region identified by the address information in the validation request is less than the threshold size.

4. The apparatus of claim 1, wherein the controller has direct memory access of the memory.

5. The apparatus of claim 1, wherein the computing of the cryptographic value is based on an application of a cryptographic hash function on the retrieved information.

6. The apparatus of claim 1, wherein the retrieved information comprises machine-readable instructions executable by the target system.

7. The apparatus of claim 1, wherein the retrieved information comprises one or more of configuration information or security information of the target system.

8. The apparatus of claim 1, wherein the target system comprises a processor to execute machine-readable instructions, and the controller operates independently of the processor of the target system.

9. The apparatus of claim 1, wherein the validation request comprises an operation mode field settable to a first value and a second value, and wherein the controller is to:
based on detecting the operation mode field set to the first value, include the compromise indicator in the output sent from the controller to the validator system.

10. The apparatus of claim 1, wherein the validator system and the target system are separate embedded systems of the electronic device.

11. The apparatus of claim 1, wherein the controller comprises hardware to perform the receiving, the determining, the retrieving, the computing, the setting, and the sending.

12. The apparatus of claim 1, wherein the output comprises an interrupt signal to the validator system.

13. The apparatus of claim 1, wherein the controller is to perform the receiving, the determining, the retrieving, the computing, the setting, and the sending during a runtime of the electronic device.

14. An electronic device comprising:
a memory to store information associated with a target system;
a memory transducer comprising a controller, the controller to:
receive, from a validator system, a validation request comprising address information identifying a memory region in the memory to validate, wherein the information in the memory is inaccessible to the validator system, and wherein the target system is separate from the validator system,
determine whether the address information in the validation request identifies the memory region with a size exceeding a threshold size, wherein the size being less than the threshold size indicates an error condition,
based on a determination that the size of the memory region identified by the address information in the validation request exceeds the threshold size, retrieve the information from the memory region in the memory,
compute a cryptographic value based on the retrieved information, and
send, from the controller to the validator system, an output based on the cryptographic value as a response to the validation request; and
a comparator to compare the computed cryptographic value to a reference cryptographic value, and based on determining the computed cryptographic value does not match the reference cryptographic value, set a compromise indicator indicating to the validator system a potential compromise of the information in the memory region identified by the address information.

15. The electronic device of claim 14, wherein the validation request further comprises an operational mode indicator to indicate an operational mode of the memory transducer, wherein the operational mode indicator if set to a first value causes the memory transducer to return the cryptographic value to the validator system, and the operational mode indicator if set to a different second value causes the memory transducer to return the compromise indicator.

16. The electronic device of claim 14, wherein the comparator is part of the validator system.

17. The electronic device of claim 14, wherein the comparator is part of the memory transducer.

18. A method comprising:
receiving, at a controller from a validator system in an electronic device, a validation request comprising address information identifying a memory region in a memory to validate, wherein the memory is associated with a target system to be validated and the memory is inaccessible to the validator system, and wherein the target system is part of the electronic device and is separate from the validator system;
determining, by the controller, whether the address information in the validation request identifies the memory region with a size exceeding a threshold size, wherein the size being less than the threshold size indicates an error condition;
based on a determination that the size of the memory region identified by the address information in the validation request exceeds the threshold size, retrieving, by the controller, information from the memory region in the memory identified by the address information;
computing, by the controller, a cryptographic value based on the retrieved information;
sending, from the controller to the validator system, an output based on the cryptographic value as a response to the validation request;
comparing, by a comparator, the computed cryptographic value to a reference cryptographic value; and
based on determining the computed cryptographic value does not match the reference cryptographic value, setting, by the comparator, a compromise indicator indicating to the validator system a potential compromise of the information in the memory region identified by the address information.

19. The method of claim 18, further comprising:
, obtaining, by the controller, the reference cryptographic value from the validation request; and
including, in the output sent from the controller to the validator system, the compromise indicator.

20. The method of claim 18, wherein the comparator is part of the controller or the validator system.

* * * * *